(12) United States Patent
Park et al.

(10) Patent No.: US 11,808,919 B2
(45) Date of Patent: Nov. 7, 2023

(54) OPTICAL IMAGING SYSTEM INCLUDING SEVEN LENSES OF +−+−++− OR +−+−−+− REFRACTIVE POWERS

(71) Applicant: Samsung Electro-Mechanics Co., Ltd., Suwon-si (KR)

(72) Inventors: Il Yong Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 362 days.

(21) Appl. No.: 17/017,792

(22) Filed: Sep. 11, 2020

(65) Prior Publication Data

US 2021/0382273 A1    Dec. 9, 2021

(30) Foreign Application Priority Data

Jun. 4, 2020  (KR) .................. 10-2020-0067933

(51) Int. Cl.
  *G02B 13/00* (2006.01)
  *G02B 9/64* (2006.01)
(52) U.S. Cl.
  CPC .......... *G02B 13/0045* (2013.01); *G02B 9/64* (2013.01)
(58) Field of Classification Search
  CPC .............. G02B 13/0045; G02B 9/64
  See application file for complete search history.

(56) References Cited

U.S. PATENT DOCUMENTS

| | | |
|---|---|---|
| 2016/0299319 A1 | 10/2016 | Tang et al. |
| 2018/0267275 A1 | 9/2018 | Fukaya |
| 2019/0025549 A1 | 1/2019 | Hsueh et al. |
| 2019/0155000 A1 | 5/2019 | Hashimoto |
| 2019/0204553 A1 | 7/2019 | Lian et al. |
| 2019/0285863 A1 | 9/2019 | Yang |
| 2019/0302424 A1 | 10/2019 | Kuo et al. |
| 2019/0353874 A1 | 11/2019 | Yeh et al. |
| 2019/0369361 A1 | 12/2019 | Yoo et al. |
| 2020/0158993 A1 | 5/2020 | Park et al. |
| 2020/0225449 A1 | 7/2020 | Zirkel et al. |
| 2020/0249435 A1 | 8/2020 | Nitta |

(Continued)

FOREIGN PATENT DOCUMENTS

| | | |
|---|---|---|
| CN | 106054353 A | 10/2016 |
| CN | 107490841 A | 12/2017 |

(Continued)

OTHER PUBLICATIONS

Taiwanese Office Action dated Dec. 2, 2021 in corresponding Taiwanese Patent Application No. 110129030 (19 pages in English and 18 pages in Mandarin Chinese).

(Continued)

*Primary Examiner* — Wen Huang
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens disposed in order from an object side, wherein TTL/(2*IMG HT)≤0.6 is satisfied, where TTL is a distance on an optical axis from an object-side surface of the first lens to an imaging plane of an image sensor, and IMG HT is half a diagonal length of the imaging plane of the image sensor.

18 Claims, 10 Drawing Sheets

(56) References Cited

U.S. PATENT DOCUMENTS

| | | |
|---|---|---|
| 2020/0301110 A1 | 9/2020 | Hsu et al. |
| 2021/0003829 A1 | 1/2021 | Dai et al. |
| 2021/0063697 A1* | 3/2021 | Li .................... G02B 9/64 |
| 2021/0096326 A1 | 4/2021 | Lu et al. |
| 2021/0149162 A1* | 5/2021 | Jhang ............ G02B 27/005 |
| 2021/0396960 A1* | 12/2021 | Yang .................. G03B 7/12 |
| 2021/0405330 A1* | 12/2021 | Dang .................. G02B 9/64 |

FOREIGN PATENT DOCUMENTS

| | | |
|---|---|---|
| CN | 107678131 A | 2/2018 |
| CN | 109031628 A | 12/2018 |
| CN | 109283655 A | 1/2019 |
| CN | 110515175 A | 11/2019 |
| CN | 110542996 A | 12/2019 |
| CN | 110780424 A | 2/2020 |
| JP | 2020-30273 A | 2/2020 |
| JP | 2020-71270 A | 5/2020 |
| KR | 10-2019-0135891 A | 12/2019 |
| KR | 10-2020-0059534 A | 5/2020 |
| TW | I679443 B | 12/2019 |
| TW | I696861 B | 6/2020 |
| TW | I698659 B | 7/2020 |
| TW | M598418 U | 7/2020 |
| TW | I702418 B | 8/2020 |
| TW | 202034015 A | 9/2020 |
| TW | 202141113 A | 11/2021 |

OTHER PUBLICATIONS

Chinese Office Action dated May 31, 2022, in counterpart Chinese Patent Application No. 202011384153.2 (12 pages in English and 13 pages in Chinese).

Taiwanese Office Action dated Jan. 28, 2021 in counterpart Taiwanese Patent Application No. 109131817 (11 pages in English and 12 pages in Mandarin Chinese).

Chinese Office Action dated Nov. 24, 2022, in counterpart Chinese Patent Application No. 202011384153.2 (9 pages in English, 10, pages in Chinese).

Korean Office Action dated Feb. 11, 2022, in counterpart Korean Patent Application No. 10-2020-0067933 (5 pages in English and 4 pages in Korean).

Korean Office Action dated Dec. 26, 2022, in counterpart Korean Patent Application No. 10-2022-0157691 (6 pages in English, 4 pages in Korean).

Korean Office Action dated Apr. 11, 2023, in counterpart Korean Patent Application No. 10-2023-0025215 (6 pages in English, 4 pages in Korean).

* cited by examiner

OPTICAL IMAGING SYSTEM INCLUDING SEVEN LENSES OF +−+++− OR +−+−−+− REFRACTIVE POWERS

CROSS-REFERENCE TO RELATED APPLICATIONS

This application claims the benefit under 35 USC 119(a) of Korean Patent Application No. 10-2020-0067933 filed on Jun. 4, 2020, in the Korean Intellectual Property Office, the entire disclosure of which is incorporated herein by reference for all purposes.

BACKGROUND

1. Field

The present disclosure relates to an optical imaging system.

2. Description of the Background

A portable terminal device may be designed to include a camera including an optical imaging system provided with a plurality of lenses to perform video calls and to image objects.

As increased functions of a camera may be desired in a portable terminal device, there has been increasing demand for a camera, used for a portable terminal device, having high resolution.

As a portable terminal device may be designed to have a reduced size, it may be required for a camera used for a portable terminal device to have a reduced size.

Thus, it may be necessary to develop an optical imaging system which has a reduced size and high resolution.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens disposed in order from an object side, wherein TTL/(2*IMG HT)≤0.6 is satisfied, where TTL is a distance on an optical axis from an object-side surface of the first lens to an imaging plane of an image sensor, and IMG HT is half a diagonal length of the imaging plane of the image sensor.

Conditional expression (v2+v3+v4+v5)/v1<2 may be satisfied, where v1 is an Abbe number of the first lens, v2 is an Abbe number of the second lens, v3 is an Abbe number of the third lens, v4 is an Abbe number of the fourth lens, and v5 is an Abbe number of the fifth lens.

Conditional expression 0<f1/f<1.8 may be satisfied, where f1 is a focal length of the first lens, and f is a focal length of the optical imaging system.

Conditional expression −4<f2/f<−1 may be satisfied, where f2 is a focal length of the second lens.

Conditional expression f3/f>3 may be satisfied, where f3 is a focal length of the third lens.

Conditional expression |f4/f|>3 may be satisfied, where f4 is a focal length of the fourth lens.

Conditional expression |f5/f|>5 may be satisfied, where f5 is a focal length of the fifth lens.

Conditional expression 0<f6/f<2 may be satisfied, where f6 is a focal length of the sixth lens.

Conditional expression −2<f7/f<0 may be satisfied, where f7 is a focal length of the seventh lens.

Conditional expression TTL/f<1.2 may be satisfied, and conditional expression BFL/f<0.3 may be satisfied, where BFL is a distance on the optical axis from an image-side surface of the seventh lens to the imaging plane of the image sensor.

Conditional expression |f1/f2|<1 may be satisfied.

Conditional expression −2<f2/f3<0 may be satisfied.

Conditional expression D1/f<0.1 may be satisfied, where D1 is a distance on the optical axis from an image-side surface of the first lens to an object-side surface of the second lens.

Conditional expression 84°<FOV<92° may be satisfied, where FOV is a field of view of the optical imaging system.

Conditional expression Fno<2.2 may be satisfied, where Fno is an F number of the optical imaging system.

Conditional expression 1<f12/f<2 may be satisfied, where f12 is a combined focal length of the first lens and the second lens.

The first lens may have positive refractive power, the second lens may have negative refractive power, the third lens may have positive refractive power, the fourth lens may have negative refractive power, the sixth lens may have positive refractive power, and the seventh lens may have negative refractive power.

Conditional expression 25<v1−v2<45 may be satisfied.
Conditional expression v1−v3<35 may be satisfied.
Conditional expression 15<v1−v5<25 may be satisfied.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
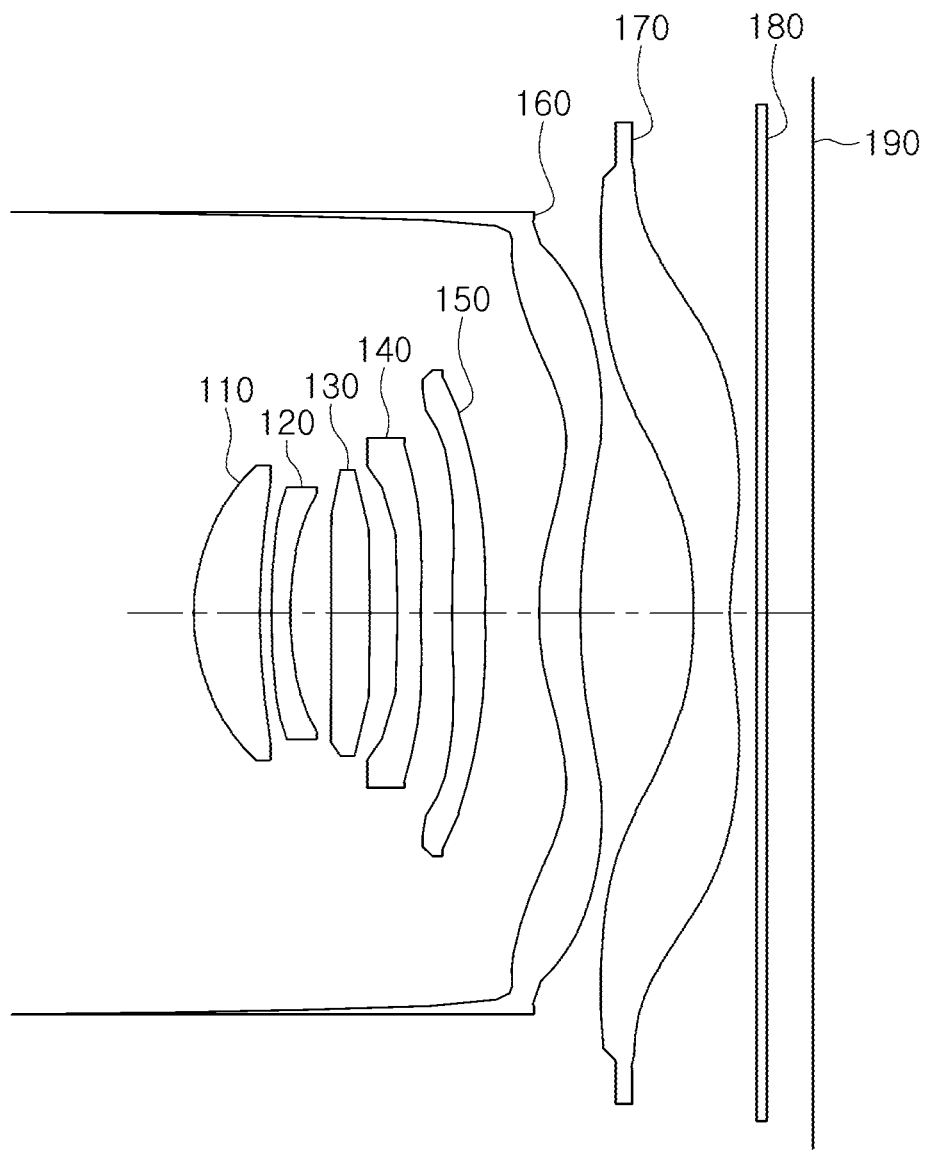
FIG. 1 is a diagram illustrating a first example of an optical imaging system.

Hereinafter, embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms, "includes," "comprises," "is configured to," "has," etc. of the description specify the presence of stated features, numbers, steps, operations, members, elements, parts, and/or combinations thereof, but do not preclude the presence or addition of one or more other features, numbers, steps, operations, members, elements, parts, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

In the following lens configuration diagrams, a thickness, a size, and a shape of a lens may be illustrated in a somewhat exaggerated manner for explanatory purposes, for example, the shape of a spherical or an aspherical surface of a lens presented in the lens configuration diagram is illustrated by way of example only, and a shape is not limited thereto.

Herein, it is noted that use of the term "may" with respect to an example, for example, as to what an example may include or implement, means that at least one example exists in which such a feature is included or implemented while all examples are not limited thereto.

A first lens refers to a lens the most adjacent to an object side, and a seventh lens refers to a lens the most adjacent to an image sensor.

Also, a first surface (or an object-side surface) refers to a surface the most adjacent to an object side, and a second surface (or an image-side surface) refers to a surface the most adjacent to an image side. Also, a radius of curvature, a thickness, a distance, a focal length, or the like, of a lens are indicated in millimeters (mm), and a field of view (FOV) is indicated in degrees.

In the descriptions of a shape of a lens, the configuration in which one surface is convex indicates that a paraxial region of the surface is convex, the configuration in which one surface is concave indicates that a paraxial region of the surface is concave, and the configuration in which one surface is planar indicates that a paraxial region of the surface is planar. Thus, even when it is described that one surface of a lens is convex, an edge of the lens may be concave. Similarly, even when it is described that one surface of a lens is concave, an edge of the lens may be convex. Also, even when it is described that one surface of a lens is planar, an edge of the lens may be convex or concave.

A paraxial region refers to a narrow region proximate to an optical axis including the optical axis.

An aspect of the present disclosure is to provide an optical imaging system which may implement high resolution and may have a reduced size.

The optical imaging system in the example embodiments may include seven lenses.

For example, the optical imaging system in the example embodiments may include a first lens, a second lens, a third lens, a fourth lens, a fifth lens, a sixth lens, and a seventh lens disposed in order from an object side. The first to seventh lenses may be spaced apart from each other by a predetermined distance along an optical axis.

However, the optical imaging system in the example embodiments does not only include seven lenses, for example, the optical imaging system may further include other elements.

For example, the optical imaging system may further include an image sensor for converting an incident image of an object into an electrical signal.

Also, the optical imaging system may further include an infrared filter (hereinafter, referred to as a filter) for blocking infrared rays. A filter may be disposed between the seventh lens and an image sensor.

Also, the optical imaging system may further include a stop for adjusting the amount of light.

The first to seventh lenses included in the optical imaging system in the example embodiments may be formed of a plastic material.

Also, at least one of the first to seventh lenses may have an aspherical surface. Also, each of the first to seventh lenses may have at least one aspherical surface.

In other words, at least one of a first surface and a second surface of each of the first to seventh lenses may be aspherical. An aspherical surface of the first to seventh lenses may be expressed by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}...$$ [Equation 1]

In equation 1, "c" is a curvature of a lens (an inverse of a radius of a curvature), "k" is a conic constant, and "Y" is a distance from a certain point on an aspherical surface of the lens to an optical axis. "A to P" are aspheric constants, and "Z" is a distance from a certain point on an aspherical surface to an apex of the aspherical surface.

The optical imaging system including the first to seventh lenses may have positive refractive power, negative refractive power, positive refractive power, negative refractive power, positive refractive power, positive refractive power, and negative refractive power, respectively, or may have positive refractive power, negative refractive power, positive refractive power, negative refractive power, negative refractive power, positive refractive power, and negative refractive power, respectively.

The optical imaging system in the example embodiments may satisfy at least one of conditional expressions as below:

| | |
|---|---|
| $0 < f1/f < 1.8$ | [Conditional Expression 1] |
| $25 < v1-v2 < 45$ | [Conditional Expression 2] |
| $v1-v3 < 35$ | [Conditional Expression 3] |
| $15 < v1-v5 < 25$ | [Conditional Expression 4] |
| $(v2+v3+v4+v5)/v1 < 2$ | [Conditional Expression 5] |
| $-4 < f2/f < -1$ | [Conditional Expression 6] |
| $f3/f > 3$ | [Conditional Expression 7] |
| $|f4/f| > 3$ | [Conditional Expression 8] |
| $|f5/f| > 5$ | [Conditional Expression 9] |
| $0 < f6/f < 2$ | [Conditional Expression 10] |
| $-2 < f7/f < 0$ | [Conditional Expression 11] |
| $TTL/f < 1.2$ | [Conditional Expression 12] |
| $|f1/f2| < 1$ | [Conditional Expression 13] |
| $-2 < f2/f3 < 0$ | [Conditional Expression 14] |
| $BFL/f < 0.3$ | [Conditional Expression 15] |
| $D1/f < 0.1$ | [Conditional Expression 16] |
| $84° < FOV < 92°$ | [Conditional Expression 17] |
| $Fno < 2.2$ | [Conditional Expression 18] |
| $TTL/(2*IMG\ HT) \leq 0.6$ | [Conditional Expression 19] |
| $1 < f12/f < 2$ | [Conditional Expression 20] |

In the conditional expressions, f is a total focal length of the optical imaging system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f12 is a combined focal length of the first lens and the second lens.

v1 is an Abbe number of the first lens, v2 is an Abbe number of the second lens, v3 is an Abbe number of the third lens, and v5 is an Abbe number of the fifth lens.

TTL is a distance on an optical axis from an object-side surface of the first lens to an imaging plane of the image sensor, BFL is a distance on the optical axis from an image-side surface of the seventh lens to an imaging plane of the image sensor, D1 is a distance on an optical axis between an image-side surface of the first lens and an object-side surface of the second lens, and IMG HT is half a diagonal length of the imaging plane of the image sensor.

FOV is a field of view of an optical imaging system, and Fno is an (F-number) of the optical imaging system.

In the description below, the first to seventh lenses included in the optical imaging system of the example embodiments will be described.

The first lens may have positive refractive power. Also, the first lens may have a meniscus shape convex toward an object side. In other words, a first surface of the first lens may be convex, and a second surface of the first lens may be concave.

At least one of the first surface and the second surface of the first surface may be aspherical. For example, both surfaces of the first lens may be aspherical.

The second lens may have negative refractive power. Also, the second lens may have a meniscus shape convex toward an object side. In other words, the first surface of the second lens may be convex, and the second surface of the second lens may be concave.

At least one surface of the first surface and the second surface of the second lens may be aspherical. For example, both surfaces of the second lens may be aspherical.

The third lens may have positive refractive power. Also, both surfaces of the third lens may convex. In other words, the first and second surfaces of the third lens may be convex.

Alternatively, the third lens may have a meniscus shape convex toward an object side. In other words, the first surface of the third lens may be convex, and the second surface of the third lens may be concave.

At least one the first surface and the second surface of the third lens may be aspherical. For example, both surfaces of the third lens may be aspherical.

The fourth lens may have negative refractive power. Also, both surfaces of the fourth lens may be concave. In other words, the first surface and the second surface of the fourth lens may be concave.

At least one surface of the first lens and the second surface of the fourth lens may be aspherical. For example, both surfaces of the fourth lens may be aspherical.

The fifth lens may have positive or negative refractive power. Also, the fifth lens may have a meniscus shape convex toward an object side. In other words, the first surface of the fifth lens may be convex in a paraxial region, and the second surface of the fifth lens may be concave in a paraxial region.

At least one surface of the first surface and the second surface of the fifth lens may be aspherical. For example, both surfaces of the fifth lens may be aspherical.

The fifth lens may have at least one inflection point formed on at least one of the first surface and the second surface. For example, the first surface of the fifth lens may be convex in a paraxial region and may be concave in portions other than a paraxial region. The second surface of the fifth lens may be concave in a paraxial region, and may be convex in portions other than a paraxial region.

The sixth lens may have positive refractive power. Also, the sixth lens may have a meniscus shape convex toward an object side. In other words, the first surface of the sixth lens may be convex in a paraxial region, and the second surface may be concave in a paraxial region.

At least one surface of the first surface and the second surface of the sixth may be aspherical. For example, both surfaces of the sixth lens may be aspherical.

The sixth lens may have at least one inflection point formed on at least one of the first surface and the second surface. For example, the first surface of the sixth lens may be convex in a paraxial region and may be concave in portions other than a paraxial region. The second surface of the sixth lens may be concave in a paraxial region and may be convex in portions other than a paraxial region The seventh lens may have negative refractive power. Also, both surfaces of the seventh lens may be concave. In other words, the first and second surfaces of the seventh lens may be concave in a paraxial region.

At least one surface of the first surface and the second surface may be aspherical. For example, both surfaces of the seventh lens may be aspherical.

At least one inflection point may be formed on at least one of the first and second surfaces of the seventh lens. For example, the first surface of the seventh lens may be concave in a paraxial region and may be convex in portions other than a paraxial region. The second surface of the seventh lens may be concave in a paraxial region and may be convex in portions other than a paraxial region.

The first lens and the second lens may be formed of plastic materials having different optical properties from each other, and the second lens and the third lens may be formed of plastic materials having different optical properties from each other. Also, the first to third lenses may be formed of plastic materials having different optical properties from each other.

Meanwhile, at least three of the first to seventh lenses may have a refractive index of greater than 1.64.

Also, at least two of the first to seventh lenses may have a refractive index of greater than 1.66.

Among the first to fourth lenses, a lens having negative refractive power may have a refractive index of greater than 1.66. For example, the second lens and the fourth lens may have negative refractive power and may have a refractive index of greater than 1.66.

Also, among the first to fourth lenses, a lens disposed between lenses having a refractive index of greater than 1.66 may have positive refractive power and may have a refractive index of greater than 1.64. For example, the third lens may have positive refractive power and a refractive index of greater than 1.64.

A first example of the optical imaging system will be described with reference to FIG. 1.

The optical imaging system of the first example may include an optical system including a first lens 110, a second lens 120, a third lens 130, a fourth lens 140, a fifth lens 150, a sixth lens 160, and a seventh lens 170, and may further include a stop, a filter 180, and an image sensor 190.

Lens characteristics (a radius of curvature, a thickness of a lens or a distance between lenses, a refractive index, an Abbe number, and a focal length) of each lens are indicated in Table 1 below.

TABLE 1

| Surface No. | Note | Radius of Curvature | Thickness or Distance | Refractive Index | Abbe Number | Focal Length |
|---|---|---|---|---|---|---|
| S1 | First Lens | 2.29841 | 0.76239 | 1.547 | 56.1 | 5.58 |
| S2 | | 8.22112 | 0.11438 | | | |
| S3 | Second Lens | 6.38617 | 0.21051 | 1.680 | 19.2 | −14.45 |
| S4 | | 3.81806 | 0.46482 | | | |
| S5 | Third Lens | 25.87199 | 0.43025 | 1.642 | 23.9 | 31.85 |
| S6 | | −96.68416 | 0.30698 | | | |
| S7 | Fourth Lens | −65.14354 | 0.27550 | 1.680 | 19.2 | −21.80 |
| S8 | | 19.20686 | 0.34914 | | | |
| S9 | Fifth Lens | 9.76229 | 0.37269 | 1.571 | 37.4 | 44.20 |
| S10 | | 15.69514 | 0.59161 | | | |
| S11 | Sixth Lens | 3.17056 | 0.46896 | 1.547 | 56.1 | 8.00 |
| S12 | | 10.95091 | 1.26839 | | | |
| S13 | Seventh Lens | −9.64588 | 0.41100 | 1.547 | 56.1 | −4.33 |
| S14 | | 3.17913 | 0.10832 | | | |
| S15 | Filter | Infinity | 0.11000 | 1.519 | 64.2 | |
| S16 | | Infinity | 0.72206 | | | |
| S17 | Imaging Plane | Infinity | | | | |

A focal length f of the optical imaging system of the first example is 6.17 mm, f12 is 8.10 mm, Fno is 2.1, FOV is 86.8°, and IMG HT is 6 mm.

f12 is a combined focal length of the first lens and the second lens, Fno is a number representing brightness of the optical imaging system, FOV is a field of view of the optical imaging system, and IMG HT is half a diagonal length of an imaging plane of the image sensor.

In the first example, the first lens 110 may have positive refractive power, the first surface of the first lens 110 may be convex, and the second surface of the first lens 110 may be concave.

The second lens 120 may have negative refractive power, the first surface of the second lens 120 may be convex, and the second surface of the second lens 120 may be concave.

The third lens 130 may have positive refractive power, and the first and second surfaces of the third lens 130 may be convex.

The fourth lens 140 may have negative refractive power, and the first and second surfaces of the fourth lens 140 may be concave.

The fifth lens 150 may have positive refractive power, the first surface of the fifth lens 150 may be convex in a paraxial region, and the second surface of the fifth lens 150 may be concave in a paraxial region.

Also, at least one inflection point may be formed on at least one of the first and second surfaces of the fifth lens 150. For example, the first surface of the fifth lens 150 may be convex in a paraxial region and may be concave in portions other than a paraxial region. Further, the second surface of the fifth lens 150 may be concave in a paraxial region and may be convex in portions other than a paraxial region.

The sixth lens 160 may have a positive refractive power, the first surface of the sixth lens 160 may be convex in a paraxial region, and the second surface of the sixth lens 160 may be concave in a paraxial region.

At least one inflection point may be formed on at least one of the first and second surfaces of the sixth lens 160. For example, the first surface of the sixth lens 160 may be convex in a paraxial region and may be concave in portions other than a paraxial region. Further, the second surface of the sixth lens 160 may be concave in a paraxial region and may be convex in portions other than a paraxial region.

The seventh lens 170 may have negative refractive power, and the first and second surfaces of the seventh lens 170 may be concave in a paraxial region.

At least one inflection point may be formed on at least one of the first and second surfaces of the seventh lens 170. For example, the first surface of the seventh lens 170 may be concave in a paraxial region and may be convex in portions other than a paraxial region. Further, the second surface of the seventh lens 170 may be concave in a paraxial region and may be convex in portions other than a paraxial region.

Each surface of the first lens 110 to the seventh lens 170 may have an aspherical coefficient as in Table 2. For example, both an object-side surface and an image-side surface of each of the first lens 110 to the seventh lens 170 may be aspherical.

TABLE 2

|  | S1 | S2 | S3 | S4 | S5 | S6 | S7 |
|---|---|---|---|---|---|---|---|
| Conic Constant(K) | −0.83 | 15.36 | 16.18 | 3.88 | −95.00 | 99.00 | 99.00 |
| Fourth Coefficient(A) | −0.01 | −0.06 | −0.08 | −0.07 | 0.00 | 0.02 | 0.04 |
| Sixth Coefficient(B) | 0.17 | 0.43 | 0.35 | 0.62 | −0.12 | −0.34 | −0.49 |
| Eighth Coefficient(C) | −0.78 | −3.03 | −2.16 | −4.74 | 0.60 | 1.83 | 1.86 |
| Tenth Coefficient(D) | 2.32 | 13.58 | 9.86 | 23.57 | −1.95 | −6.58 | −4.69 |
| Twelfth Coefficient(E) | −4.74 | −39.95 | −30.68 | −77.17 | 4.25 | 16.36 | 8.05 |
| Fourteenth Coefficient(F) | 6.88 | 80.55 | 66.65 | 173.86 | −6.35 | −28.77 | −9.64 |
| Sixteenth Coefficient(G) | −7.21 | −114.48 | −103.41 | −277.74 | 6.59 | 36.40 | 8.15 |
| Eighteenth Coefficient(H) | 5.53 | 116.48 | 115.99 | 319.76 | −4.72 | −33.39 | −4.86 |
| Twentieth Coefficient(J) | −3.09 | −85.17 | −94.19 | −266.37 | 2.26 | 22.20 | 2.00 |
| Twenty Second Coefficient(L) | 1.25 | 44.37 | 54.83 | 159.17 | −0.66 | −10.58 | −0.54 |
| Twenty Fourth Coefficient(M) | −0.36 | −16.06 | −22.29 | −66.52 | 0.08 | 3.51 | 0.08 |
| Twenty Sixth Coefficient(N) | 0.07 | 3.84 | 6.01 | 18.47 | 0.01 | −0.77 | 0.00 |
| Twenty Eighth Coefficient(O) | −0.01 | −0.54 | −0.97 | −3.06 | −0.01 | 0.10 | 0.00 |
| Thirtieth Coefficient(P) | 0.00 | 0.03 | 0.07 | 0.23 | 0.00 | −0.01 | 0.00 |

|  | S8 | S9 | S10 | S11 | S12 | S13 | S14 |
|---|---|---|---|---|---|---|---|
| Conic Constant(K) | 93.86 | 13.88 | −54.79 | −6.27 | −2.72 | −3.31 | −18.40 |
| Fourth Coefficient(A) | 0.00 | −0.05 | −0.07 | 0.02 | 0.05 | −0.08 | −0.05 |
| Sixth Coefficient(B) | −0.15 | −0.01 | 0.01 | −0.03 | −0.03 | 0.05 | 0.02 |
| Eighth Coefficient(C) | 0.41 | 0.07 | 0.02 | 0.01 | 0.01 | −0.02 | −0.01 |

TABLE 2-continued

| | | | | | | | |
|---|---|---|---|---|---|---|---|
| Tenth Coefficient(D) | −0.76 | −0.10 | −0.02 | −0.01 | 0.00 | 0.01 | 0.00 |
| Twelfth Coefficient(E) | 0.95 | 0.09 | 0.01 | 0.00 | 0.00 | 0.00 | 0.00 |
| Fourteenth Coefficient(F) | −0.83 | −0.06 | −0.01 | 0.00 | 0.00 | 0.00 | 0.00 |
| Sixteenth Coefficient(G) | 0.52 | 0.03 | 0.00 | 0.00 | 0.00 | 0.00 | 0.00 |
| Eighteenth Coefficient(H) | −0.23 | −0.01 | 0.00 | 0.00 | 0.00 | 0.00 | 0.00 |
| Twentieth Coefficient(J) | 0.07 | 0.00 | 0.00 | 0.00 | 0.00 | 0.00 | 0.00 |
| Twenty Second Coefficient(L) | −0.01 | 0.00 | 0.00 | 0.00 | 0.00 | 0.00 | 0.00 |
| Twenty Fourth Coefficient(M) | 0.00 | 0.00 | 0.00 | 0.00 | 0.00 | 0.00 | 0.00 |
| Twenty Sixth Coefficient(N) | 0.00 | 0.00 | 0.00 | 0.00 | 0.00 | 0.00 | 0.00 |
| Twenty Eighth Coefficient(O) | 0.00 | 0.00 | 0.00 | 0.00 | 0.00 | 0.00 | 0.00 |
| Thirtieth Coefficient(P) | 0.00 | 0.00 | 0.00 | 0.00 | 0.00 | 0.00 | 0.00 |

Figure 2:
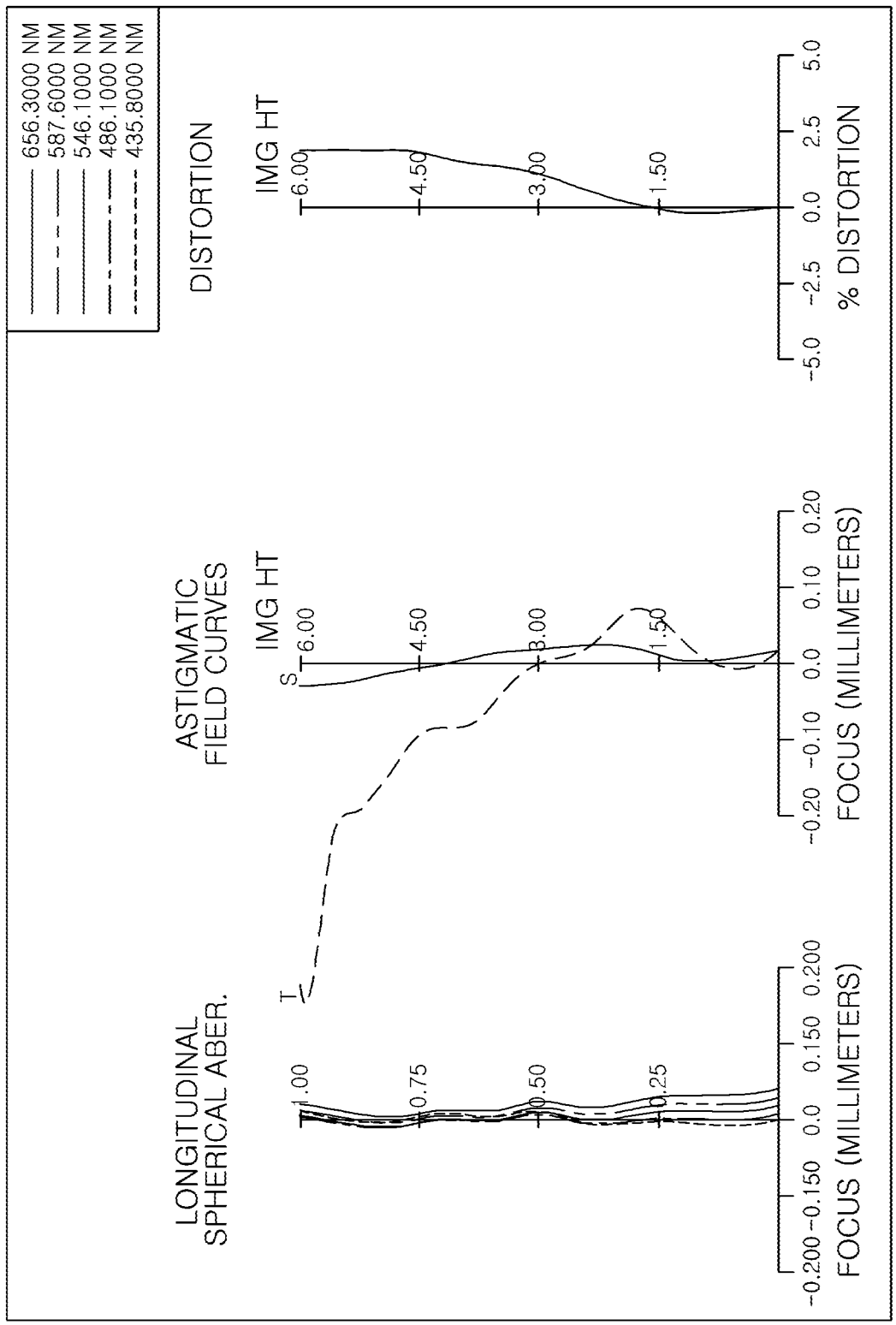
FIG. 2 is a diagram illustrating aberration properties of the optical imaging system illustrated in FIG. 1.

In addition, the optical imaging system as described in the first example above may have aberration characteristics as illustrated in FIG. 2.

Figure 3:
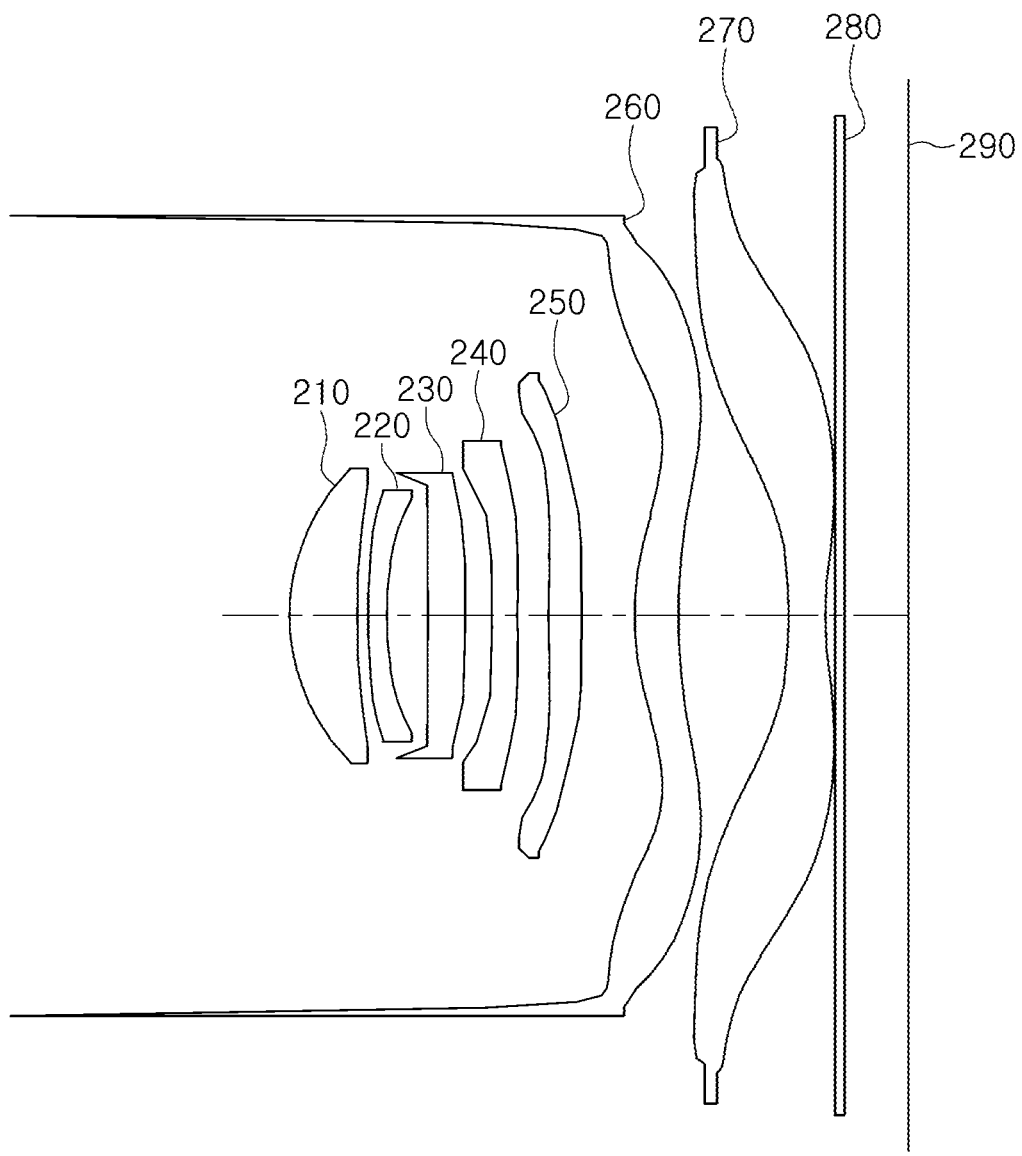
FIG. 3 is a diagram illustrating a second example of an optical imaging system.

A second example of the optical imaging system will be described with reference to FIG. 3.

The optical imaging system of the second example may include an optical system including a first lens 210, a second lens 220, a third lens 230, a fourth lens 240, a fifth lens 250, a sixth lens 260, and a seventh lens 270, and may further include a stop, a filter 280, and an image sensor 290.

Lens characteristics (a radius of curvature, a thickness of a lens or a distance between lenses, a refractive index, an Abbe number, and a focal length) of each lens are indicated in Table 3 below.

TABLE 3

| Surface No. | Note | Radius of Curvature | Thickness or Distance | Refractive Index | Abbe Number | Focal Length |
|---|---|---|---|---|---|---|
| S1 | First Lens | 2.28849 | 0.76330 | 1.547 | 56.1 | 5.55 |
| S2 | | 8.20854 | 0.11509 | | | |
| S3 | Second Lens | 6.35935 | 0.21000 | 1.680 | 19.2 | −14.36 |
| S4 | | 3.79882 | 0.45821 | | | |
| S5 | Third Lens | 26.99476 | 0.42935 | 1.642 | 23.9 | 31.63 |
| S6 | | −81.29169 | 0.30492 | | | |
| S7 | Fourth Lens | −64.86509 | 0.27801 | 1.680 | 19.2 | −21.77 |
| S8 | | 19.19682 | 0.35142 | | | |
| S9 | Fifth Lens | 9.71006 | 0.37424 | 1.571 | 37.4 | 44.77 |
| S10 | | 15.43466 | 0.59445 | | | |
| S11 | Sixth Lens | 3.13158 | 0.48624 | 1.547 | 56.1 | 8.01 |
| S12 | | 10.38317 | 1.24176 | | | |
| S13 | Seventh Lens | −9.93485 | 0.41013 | 1.547 | 56.1 | −4.36 |
| S14 | | 3.17888 | 0.10286 | | | |
| S15 | Filter | Infinity | 0.11000 | 1.519 | 64.2 | |
| S16 | | Infinity | 0.72000 | | | |
| S17 | Imaging Plane | Infinity | | | | |

A focal length f of the optical imaging system of the second example is 6.14 mm, f12 is 8.06 mm, Fno is 2.09, FOV is 86.9°, and IMG HT is 6 mm.

The definitions of f12, Fno, FOV, and IMG HT are as in the first example.

In the second example, the first lens 210 may have positive refractive power, the first surface of the first lens 210 may be convex, and the second surface of the first lens 210 may be concave.

The second lens 220 may have negative refractive power, the first surface of the second lens 220 may be convex, and the second surface of the second lens 220 may be concave.

The third lens 230 may have positive refractive power, and the first and second surfaces of the third lens 230 may be convex.

The fourth lens 240 may have negative refractive power, and the first and second surfaces of the fourth lens 240 may be concave.

The fifth lens 250 may have positive refractive power, the first surface of the fifth lens 250 may be convex in a paraxial region, and the second surface of the fifth lens 250 may be concave in a paraxial region.

Also, at least one inflection point may be formed on at least one of the first and second surfaces of the fifth lens 250. For example, the first surface of the fifth lens 250 may be convex in a paraxial region and may be concave in portions other than a paraxial region. Further, the second surface of the fifth lens 250 may be concave in a paraxial region and may be convex in portions other than a paraxial region.

The sixth lens 260 may have positive refractive power, the first surface of the sixth lens 260 may be convex in a paraxial region, and the second surface of the sixth lens 260 may be concave in a paraxial region.

At least one inflection point may be formed on at least one of the first and second surfaces of the sixth lens 260. For example, the first surface of the sixth lens 260 may be convex in a paraxial region and may be concave in portions other than a paraxial region. Further, the second surface of the sixth lens 260 may be concave in a paraxial region and may be convex in portions other than a paraxial region.

The seventh lens 270 may have negative refractive power, and the first and second surfaces of the seventh lens 270 may be concave in a paraxial region.

At least one inflection point may be formed on at least one of the first and second surfaces of the seventh lens 270. For example, the first surface of the seventh lens 270 may be concave in a paraxial region and may be convex in portions other than a paraxial region. Further, the second surface of the seventh lens 270 may be concave in a paraxial region and may be convex in portions other than a paraxial region.

Each surface of the first lens 210 to the seventh lens 270 may have an aspherical coefficient as in Table 4. For example, both an object-side surface and an image-side surface of each of the first lens 210 to the seventh lens 270 may be aspherical.

TABLE 4

| | S1 | S2 | S3 | S4 | S5 | S6 | S7 |
|---|---|---|---|---|---|---|---|
| Conic Constant(K) | −0.83 | 15.47 | 16.23 | 3.90 | −94.97 | 99.00 | 99.00 |
| Fourth Coefficient(A) | −0.02 | −0.07 | −0.10 | −0.07 | 0.00 | 0.02 | 0.04 |
| Sixth Coefficient(B) | 0.21 | 0.57 | 0.65 | 0.65 | −0.17 | −0.30 | −0.49 |
| Eighth Coefficient(C) | −0.95 | −3.65 | −4.48 | −4.94 | 0.99 | 1.42 | 1.90 |
| Tenth Coefficient(D) | 2.76 | 15.04 | 21.09 | 24.79 | −3.83 | −4.65 | −4.94 |
| Twelfth Coefficient(E) | −5.39 | −41.34 | −67.10 | −82.98 | 10.22 | 10.64 | 8.86 |
| Fourteenth Coefficient(F) | 7.28 | 78.79 | 148.90 | 192.85 | −19.37 | −17.45 | −11.22 |
| Sixteenth Coefficient(G) | −6.96 | −106.79 | −235.74 | −319.73 | 26.55 | 20.82 | 10.21 |
| Eighteenth Coefficient(H) | 4.75 | 104.35 | 269.41 | 383.55 | −26.55 | −18.19 | −6.71 |
| Twentieth Coefficient(J) | −2.31 | −73.67 | −222.52 | −333.80 | 19.35 | 11.61 | 3.17 |
| Twenty Second Coefficient(L) | 0.78 | 37.22 | 131.48 | 208.68 | −10.14 | −5.34 | −1.05 |
| Twenty Fourth Coefficient(M) | −0.18 | −13.11 | −54.14 | −91.31 | 3.72 | 1.72 | 0.24 |
| Twenty Sixth Coefficient(N) | 0.03 | 3.06 | 14.75 | 26.53 | −0.91 | −0.37 | −0.03 |
| Twenty Eighth Coefficient(O) | 0.00 | −0.42 | −2.39 | −4.60 | 0.13 | 0.05 | 0.00 |
| Thirtieth Coefficient(P) | 0.00 | 0.03 | 0.17 | 0.36 | −0.01 | 0.00 | 0.00 |

| | S8 | S9 | S10 | S11 | S12 | S13 | S14 |
|---|---|---|---|---|---|---|---|
| Conic Constant K) | 94.77 | 13.99 | −58.84 | −6.41 | −8.72 | −2.03 | −17.14 |
| Fourth Coefficient(A) | 0.00 | −0.05 | −0.07 | 0.02 | 0.05 | −0.09 | −0.05 |
| Sixth Coefficient(B) | −0.15 | −0.01 | 0.01 | −0.03 | −0.03 | 0.05 | 0.02 |
| Eighth Coefficient(C) | 0.37 | 0.06 | 0.02 | 0.02 | 0.01 | −0.02 | −0.01 |
| Tenth Coefficient(D) | −0.63 | −0.07 | −0.01 | −0.01 | 0.00 | 0.01 | 0.00 |
| Twelfth Coefficient(E) | 0.71 | 0.06 | 0.00 | 0.00 | 0.00 | 0.00 | 0.00 |
| Fourteenth Coefficient(F) | −0.54 | −0.03 | 0.00 | 0.00 | 0.00 | 0.00 | 0.00 |
| Sixteenth Coefficient(G) | 0.26 | 0.02 | 0.00 | 0.00 | 0.00 | 0.00 | 0.00 |
| Eighteenth Coefficient(H) | −0.07 | −0.01 | 0.00 | 0.00 | 0.00 | 0.00 | 0.00 |
| Twentieth Coefficient(J) | 0.00 | 0.00 | 0.00 | 0.00 | 0.00 | 0.00 | 0.00 |
| Twenty Second Coefficient(L) | 0.01 | 0.00 | 0.00 | 0.00 | 0.00 | 0.00 | 0.00 |

TABLE 4-continued

| | | | | | | | |
|---|---|---|---|---|---|---|---|
| Twenty Fourth Coefficient(M) | 0.00 | 0.00 | 0.00 | 0.00 | 0.00 | 0.00 | 0.00 |
| Twenty Sixth Coefficient(N) | 0.00 | 0.00 | 0.00 | 0.00 | 0.00 | 0.00 | 0.00 |
| Twenty Eighth Coefficient(O) | 0.00 | 0.00 | 0.00 | 0.00 | 0.00 | 0.00 | 0.00 |
| Thirtieth Coefficient(P) | 0.00 | 0.00 | 0.00 | 0.00 | 0.00 | 0.00 | 0.00 |

Figure 4:
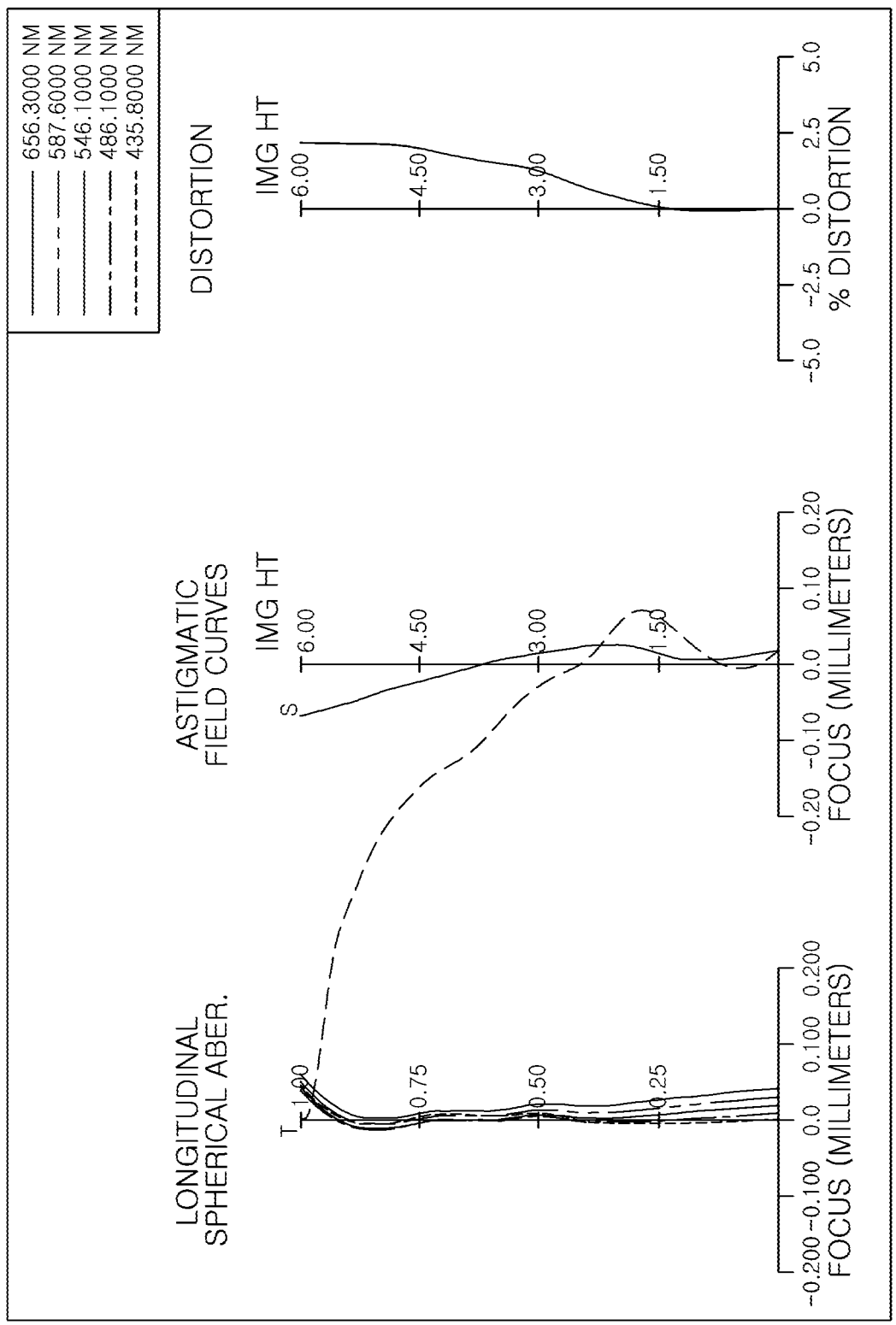
FIG. 4 is a diagram illustrating aberration properties of the optical imaging system illustrated in FIG. 3.

In addition, the optical imaging system as described in the second example above may have aberration characteristics as illustrated in FIG. 4.

Figure 5:
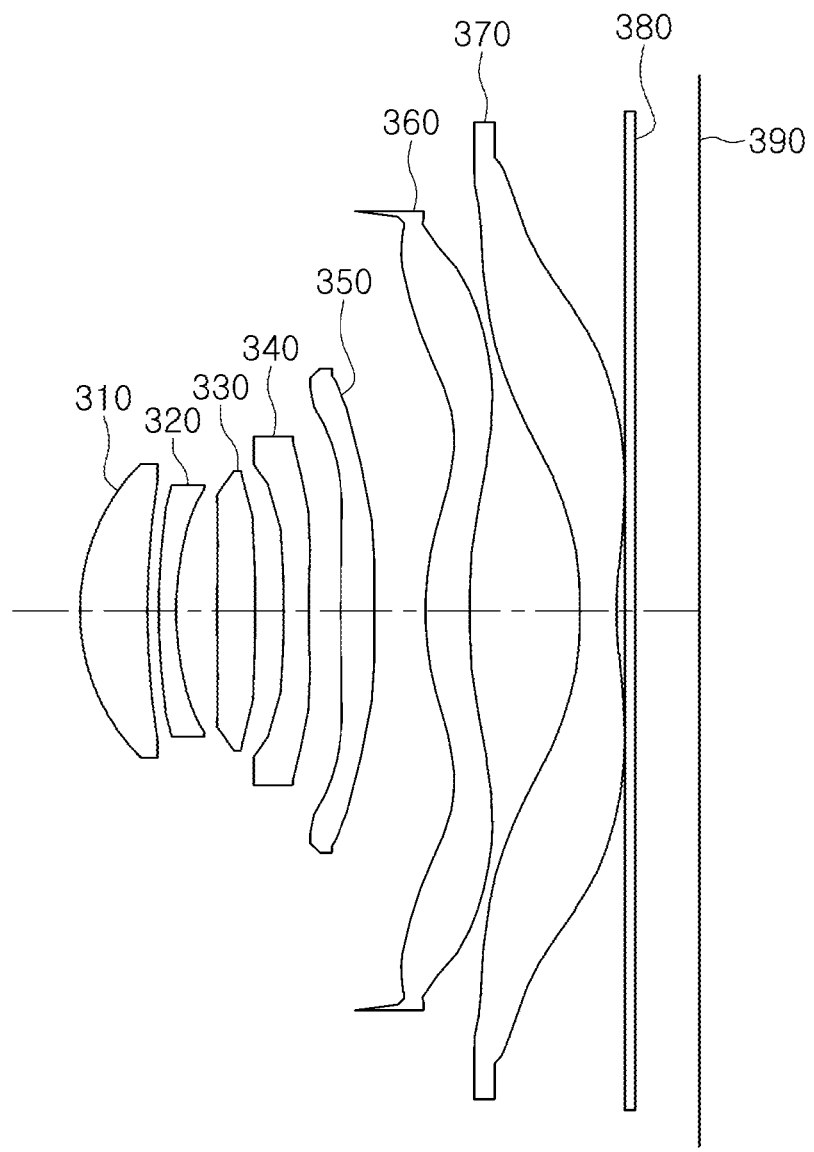
FIG. 5 is a diagram illustrating a third example of an optical imaging system.

A third example of the optical imaging system will be described with reference to FIG. 5.

The optical imaging system of the third example may include an optical system including a first lens 310, a second lens 320, a third lens 330, a fourth lens 340, a fifth lens 350, a sixth lens 360, and a seventh lens 370, and may further include a stop, a filter 380, and an image sensor 390.

Lens characteristics (a radius of curvature, a thickness of a lens or a distance between lenses, a refractive index, an Abbe number, and a focal length) of each lens are indicated in Table 5 below.

TABLE 5

| Surface No. | Note | Radius of Curvature | Thickness or Distance | Refractive Index | Abbe Number | Focal Length |
|---|---|---|---|---|---|---|
| S1 | First Lens | 2.29153 | 0.77274 | 1.547 | 56.1 | 5.55 |
| S2 | | 8.23456 | 0.10919 | | | |
| S3 | Second Lens | 6.40025 | 0.21000 | 1.680 | 19.2 | -14.39 |
| S4 | | 3.81715 | 0.45841 | | | |
| S5 | Third Lens | 21.37334 | 0.41688 | 1.642 | 23.9 | 32.50 |
| S6 | | -850.29506 | 0.32297 | | | |
| S7 | Fourth Lens | -71.39633 | 0.28900 | 1.680 | 19.2 | -22.37 |
| S8 | | 19.34188 | 0.35230 | | | |
| S9 | Fifth Lens | 9.74308 | 0.37428 | 1.571 | 37.4 | 56.83 |
| S10 | | 13.72711 | 0.57535 | | | |
| S11 | Sixth Lens | 3.08993 | 0.49707 | 1.547 | 56.1 | 7.65 |
| S12 | | 11.16346 | 1.23182 | | | |
| S13 | Seventh Lens | -9.63838 | 0.41000 | 1.547 | 56.1 | -4.28 |
| S14 | | 3.13516 | 0.10000 | | | |
| S15 | Filter | Infinity | 0.11000 | 1.519 | 64.2 | |
| S16 | | Infinity | 0.72000 | | | |
| S17 | Imaging Plane | Infinity | | | | |

A focal length f of the optical imaging system of the third example is 6.14 mm, f12 is 8.05 mm, Fno is 2.07, FOV is 86.8°, and IMG HT is 6 mm.

The definitions of f12, Fno, FOV, and IMG HT are as in the first example.

In the third example, the first lens 310 may have positive refractive power, the first surface of the first lens 310 may be convex, and the second surface of the first lens 310 may be concave.

The second lens 320 may have negative refractive power, the first surface of the second lens 320 may be convex, and the second surface of the second lens 320 may be concave.

The third lens 330 may have positive refractive power, and the first and second surfaces of the third lens 330 may be convex.

The fourth lens 340 may have negative refractive power, and the first and second surfaces of the fourth lens 340 may be concave.

The fifth lens 350 may have positive refractive power, the first surface of the fifth lens 350 may be convex in a paraxial region, and the second surface of the fifth lens 350 may be concave in a paraxial region.

Also, at least one inflection point may be formed on at least one of the first and second surfaces of the fifth lens 350. For example, the first surface of the fifth lens 350 may be convex in a paraxial region and may be concave in portions other than a paraxial region. Further, the second surface of the fifth lens 350 may be concave in a paraxial region and may be convex in portions other than a paraxial region.

The sixth lens 360 may have positive refractive power, the first surface of the sixth lens 360 may be convex in a paraxial region, and the second surface of the sixth lens 360 may be concave in a paraxial region.

At least one inflection point may be formed on at least one of the first and second surfaces of the sixth lens 360. For example, the first surface of the sixth lens 360 may be convex in a paraxial region and may be concave in portions other than a paraxial region. Further, the second surface of the sixth lens 360 may be concave in a paraxial region and may be convex in portions other than a paraxial region.

The seventh lens 370 may have negative refractive power, and the first and second surfaces of the seventh lens 370 may be concave in a paraxial region.

At least one inflection point may be formed on at least one of the first and second surfaces of the seventh lens 370. For example, the first surface of the seventh lens 370 may be concave in a paraxial region and may be convex in portions other than a paraxial region. Further, the second surface of the seventh lens 370 may be concave in a paraxial region and may be convex in portions other than a paraxial region.

Each surface of the first lens 310 to the seventh lens 370 may have an aspherical coefficient as in Table 6. For example, both an object-side surface and an image-side surface of each of the first lens 310 to the seventh lens 370 may be aspherical.

TABLE 6

| | S1 | S2 | S3 | S4 | S5 | S6 | S7 |
|---|---|---|---|---|---|---|---|
| Conic Constant(K) | −0.83 | 15.73 | 16.24 | 3.84 | −95.00 | 99.00 | 99.00 |
| Fourth Coefficient(A) | −0.02 | −0.06 | −0.08 | −0.06 | 0.00 | 0.02 | 0.05 |
| Sixth Coefficient(B) | 0.19 | 0.42 | 0.37 | 0.42 | −0.13 | −0.35 | −0.57 |
| Eighth Coefficient(C) | −0.86 | −2.64 | −2.22 | −2.91 | 0.62 | 1.75 | 2.39 |
| Tenth Coefficient(D) | 2.44 | 10.93 | 9.87 | 13.81 | −1.83 | −5.90 | −6.73 |
| Twelfth Coefficient(E) | −4.62 | −30.18 | −29.99 | −43.57 | 3.53 | 13.71 | 13.05 |
| Fourteenth Coefficient(F) | 6.03 | 57.66 | 63.75 | 95.10 | −4.40 | −22.59 | −17.95 |
| Sixteenth Coefficient(G) | −5.53 | −78.21 | −96.70 | −147.94 | 3.22 | 26.84 | 17.85 |
| Eighteenth Coefficient(H) | 3.58 | 76.37 | 105.77 | 166.68 | −0.71 | −23.20 | −12.95 |
| Twentieth Coefficient(J) | −1.62 | −53.83 | −83.48 | −136.56 | −1.11 | 14.57 | 6.85 |
| Twenty Second Coefficient(L) | 0.50 | 27.12 | 47.03 | 80.65 | 1.35 | −6.57 | −2.60 |
| Twenty Fourth Coefficient(M) | −0.10 | −9.52 | −18.42 | −33.48 | −0.75 | 2.07 | 0.69 |
| Twenty Sixth Coefficient(N) | 0.01 | 2.21 | 4.76 | 9.27 | 0.24 | −0.43 | −0.12 |
| Twenty Eighth Coefficient(O) | 0.00 | −0.31 | −0.73 | −1.54 | −0.04 | 0.05 | 0.01 |
| Thirtieth Coefficient(P) | 0.00 | 0.02 | 0.05 | 0.12 | 0.00 | 0.00 | 0.00 |

| | S8 | S9 | S10 | S11 | S12 | S13 | S14 |
|---|---|---|---|---|---|---|---|
| Conic Constant(K) | 95.22 | 13.62 | −69.03 | −6.30 | −1.63 | −1.29 | −19.37 |
| Fourth Coefficient(A) | 0.00 | −0.05 | −0.08 | 0.02 | 0.04 | −0.10 | −0.06 |
| Sixth Coefficient(B) | −0.14 | 0.00 | 0.02 | −0.02 | −0.02 | 0.07 | 0.03 |
| Eighth Coefficient(C) | 0.38 | 0.04 | 0.00 | 0.01 | 0.00 | −0.03 | −0.01 |
| Tenth Coefficient(D) | −0.70 | −0.06 | 0.00 | 0.00 | 0.00 | 0.01 | 0.00 |
| Twelfth Coefficient(E) | 0.90 | 0.05 | 0.00 | 0.00 | 0.00 | 0.00 | 0.00 |
| Fourteenth Coefficient(F) | −0.82 | −0.03 | 0.00 | 0.00 | 0.00 | 0.00 | 0.00 |
| Sixteenth Coefficient(G) | 0.53 | 0.02 | 0.00 | 0.00 | 0.00 | 0.00 | 0.00 |
| Eighteenth Coefficient(H) | −0.25 | −0.01 | 0.00 | 0.00 | 0.00 | 0.00 | 0.00 |
| Twentieth Coefficient(J) | 0.08 | 0.00 | 0.00 | 0.00 | 0.00 | 0.00 | 0.00 |
| Twenty Second Coefficient(L) | −0.02 | 0.00 | 0.00 | 0.00 | 0.00 | 0.00 | 0.00 |
| Twenty Fourth Coefficient(M) | 0.00 | 0.00 | 0.00 | 0.00 | 0.00 | 0.00 | 0.00 |

TABLE 6-continued

| | | | | | | | |
|---|---|---|---|---|---|---|---|
| Twenty Sixth Coefficient(N) | 0.00 | 0.00 | 0.00 | 0.00 | 0.00 | 0.00 | 0.00 |
| Twenty Eighth Coefficient(O) | 0.00 | 0.00 | 0.00 | 0.00 | 0.00 | 0.00 | 0.00 |
| Thirtieth Coefficient(P) | 0.00 | 0.00 | 0.00 | 0.00 | 0.00 | 0.00 | 0.00 |

Figure 6:
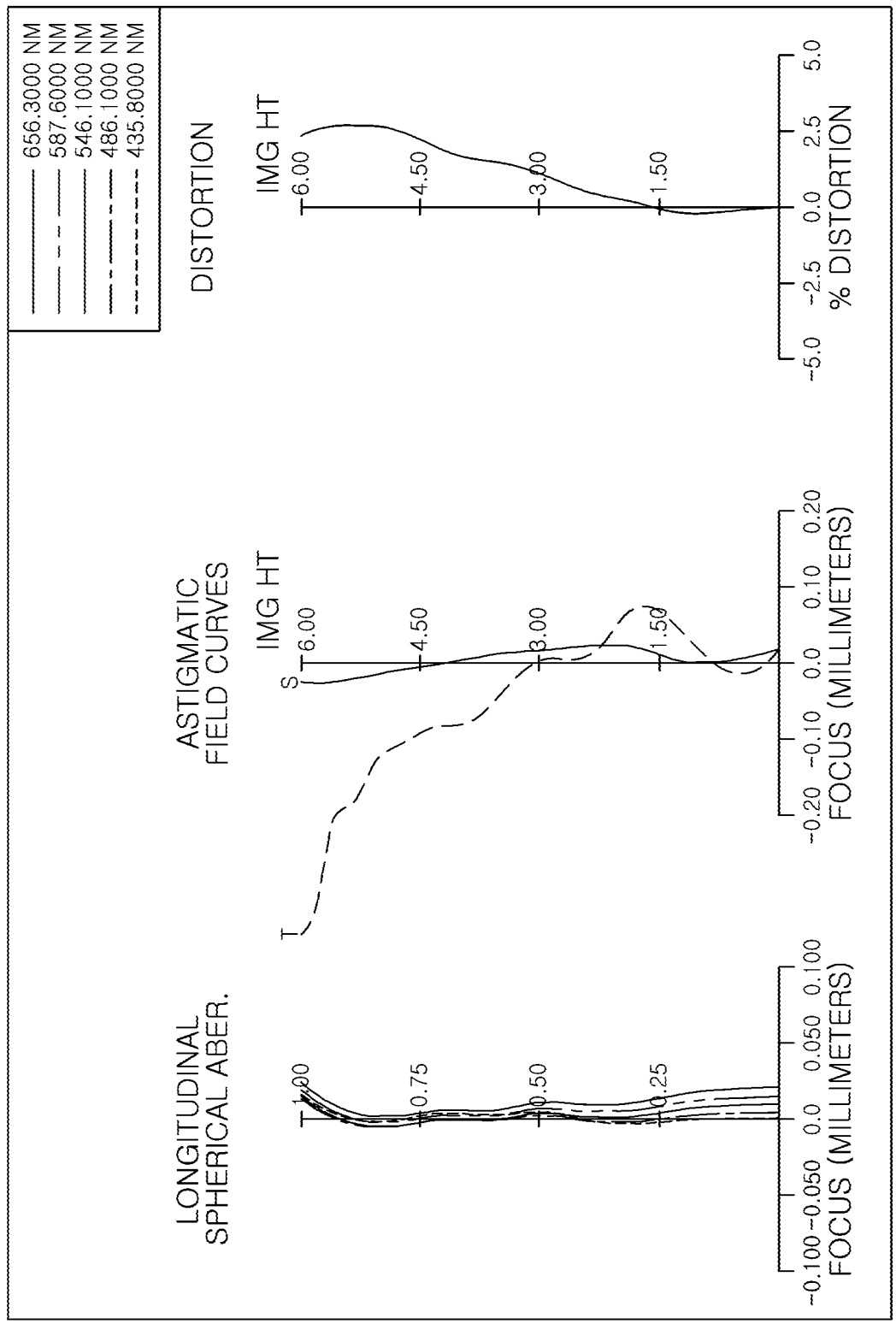
FIG. 6 is a diagram illustrating aberration properties of the optical imaging system illustrated in FIG. 5.

In addition, the optical imaging system as described in the third example above may have aberration characteristics as illustrated in FIG. 6.

Figure 7:
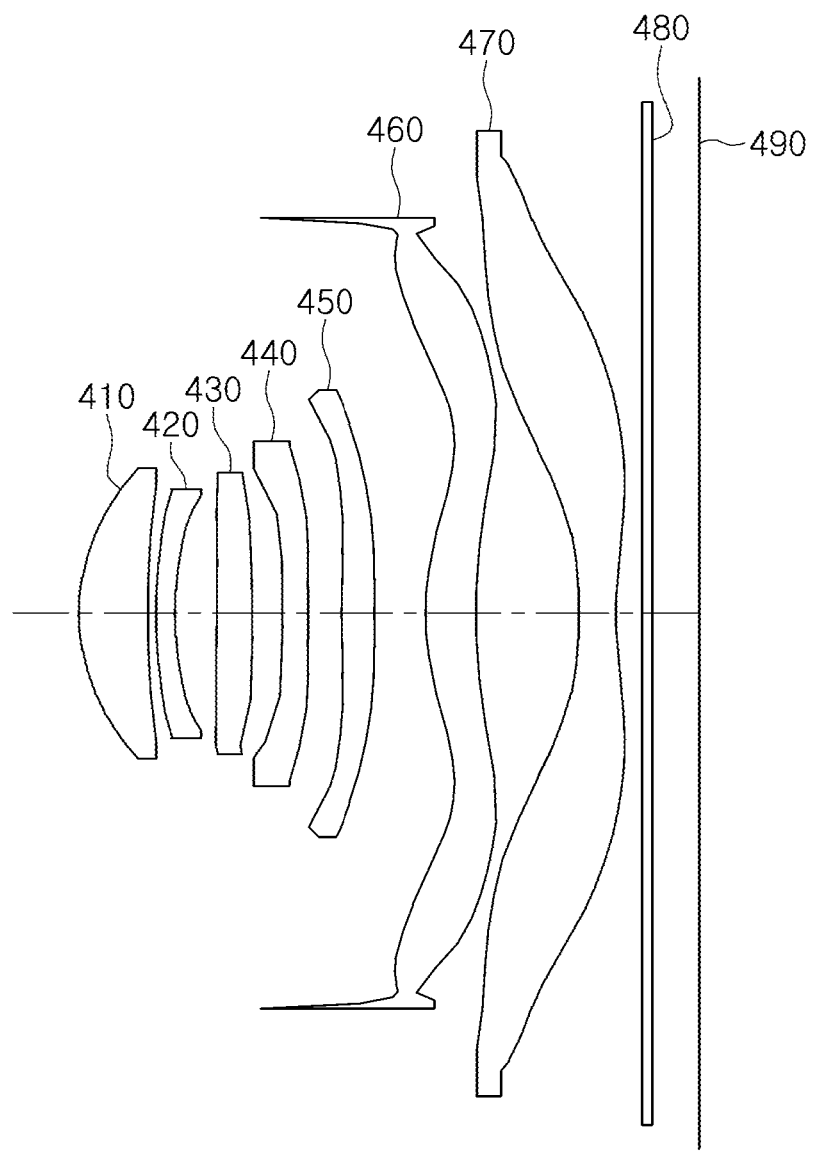
FIG. 7 is a diagram illustrating a fourth example of an optical imaging system.

A fourth example of the optical imaging system will be described with reference to FIG. 7.

The optical imaging system of the fourth example may include an optical system including a first lens 410, a second lens 420, a third lens 430, a fourth lens 440, a fifth lens 450, a sixth lens 460, and a seventh lens 470, and may further include a stop, a filter 480, and an image sensor 490.

Lens characteristics (a radius of curvature, a thickness of a lens or a distance between lenses, a refractive index, an Abbe number, and a focal length) of each lens are indicated in Table 7 below.

TABLE 7

| Surface No. | Note | Radius of Curvature | Thickness or Distance | Refractive Index | Abbe Number | Focal Length |
|---|---|---|---|---|---|---|
| S1 | First Lens | 2.30304 | 0.76509 | 1.547 | 56.1 | 5.55 |
| S2 | | 8.42496 | 0.09930 | | | |
| S3 | Second Lens | 6.28862 | 0.21000 | 1.680 | 19.2 | −15.01 |
| S4 | | 3.83778 | 0.46488 | | | |
| S5 | Third Lens | 25.14324 | 0.39999 | 1.642 | 23.9 | 35.89 |
| S6 | | −272.70980 | 0.34005 | | | |
| S7 | Fourth Lens | −82.16734 | 0.27969 | 1.680 | 19.2 | −22.63 |
| S8 | | 18.94624 | 0.37621 | | | |
| S9 | Fifth Lens | 9.98619 | 0.37957 | 1.571 | 37.4 | 90.92 |
| S10 | | 12.19270 | 0.56739 | | | |
| S11 | Sixth Lens | 2.96631 | 0.56695 | 1.547 | 56.1 | 6.98 |
| S12 | | 12.41193 | 1.15413 | | | |
| S13 | Seventh Lens | −10.27520 | 0.41000 | 1.547 | 56.1 | −4.15 |
| S14 | | 2.94704 | 0.10675 | | | |
| S15 | Filter | Infinity | 0.11000 | 1.519 | 64.2 | |
| S16 | | Infinity | 0.72000 | | | |
| S17 | Imaging Plane | Infinity | | | | |

A focal length f of the optical imaging system of the fourth example is 6.09 mm, f12 is 7.91 mm, Fno is 7.91, FOV is 87.3°, and IMG HT is 6 mm.

The definitions of f12, Fno, FOV, and IMG HT are as in the first example.

In the fourth example, the first lens 410 may have positive refractive power, the first surface of the first lens 410 may be convex, and the second surface of the first lens 410 may be concave.

The second lens 420 may have negative refractive power, the first surface of the second lens 420 may be convex, and the second surface of the second lens 420 may be concave.

The third lens 430 may have positive refractive power, and the first and second surfaces of the third lens 430 may be convex.

The fourth lens 440 may have negative refractive power, and the first and second surfaces of the fourth lens 440 may be concave.

The fifth lens 450 may have positive refractive power, the first surface of the fifth lens 450 may be convex in a paraxial region, and the second surface of the fifth lens 450 may be concave in a paraxial region.

Also, at least one inflection point may be formed on at least one of the first and second surfaces of the fifth lens 450. For example, the first surface of the fifth lens 450 may be convex in a paraxial region and may be concave in portions other than a paraxial region. Further, the second surface of the fifth lens 450 may be concave in a paraxial region and may be convex in portions other than a paraxial region.

The sixth lens 460 may have positive refractive power, the first surface of the sixth lens 460 may be convex in a paraxial region, and the second surface of the sixth lens 460 may be concave in a paraxial region.

At least one inflection point may be formed on at least one of the first and second surfaces of the sixth lens 460. For example, the first surface of the sixth lens 460 may be convex in a paraxial region and may be concave in portions other than a paraxial region. Further, the second surface of the sixth lens 460 may be concave in a paraxial region and may be convex in portions other than a paraxial region.

The seventh lens 470 may have negative refractive power, and the first and second surfaces of the seventh lens 470 may be concave in a paraxial region.

At least one inflection point may be formed on at least one of the first and second surfaces of the seventh lens 470. For example, the first surface of the seventh lens 470 may be concave in a paraxial region and may be convex in portions other than a paraxial region. Further, the second surface of the seventh lens 470 may be concave in a paraxial region and may be convex in portions other than a paraxial region.

Each surface of the first lens 410 to the seventh lens 470 may have an aspherical coefficient as in Table 8. For example, both an object-side surface and an image-side surface of each of the first lens 410 to the seventh lens 470 may be aspherical.

Figure 8:
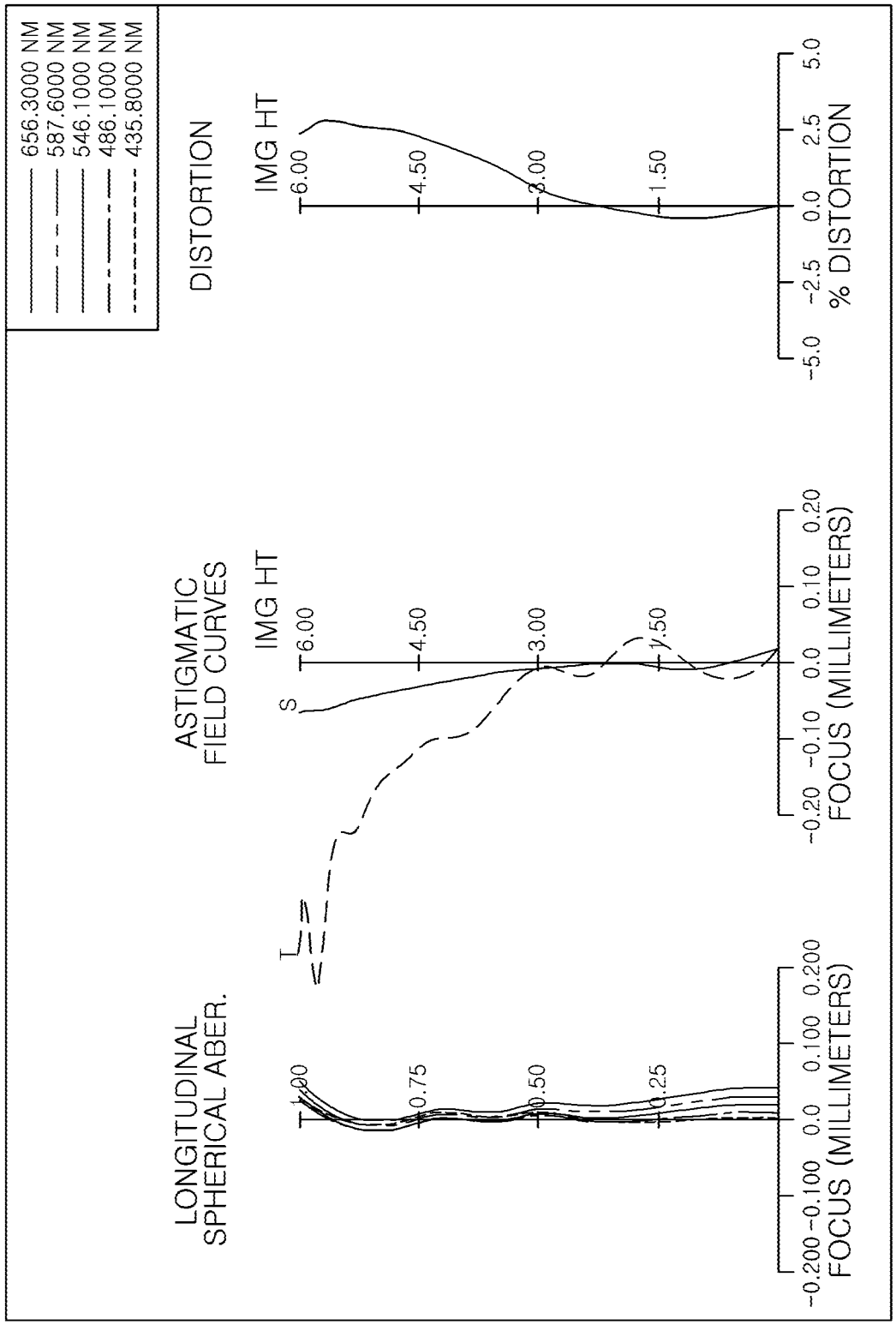
FIG. 8 is a diagram illustrating aberration properties of the optical imaging system illustrated in FIG. 7.

In addition, the optical imaging system as described in the fourth example above may have aberration characteristics as illustrated in FIG. 8.

Figure 9:
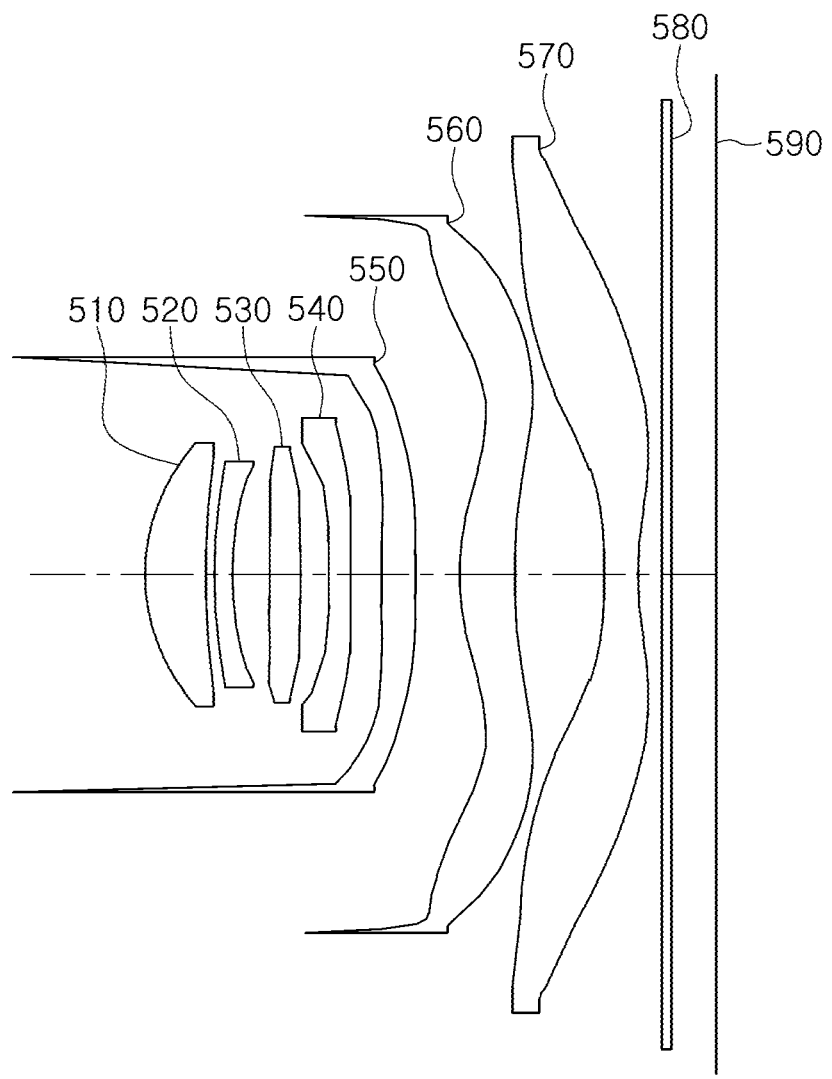
FIG. 9 is a diagram illustrating a fifth example of an optical imaging system.

A fifth example of the optical imaging system will be described with reference to FIG. 9.

The optical imaging system of the fifth example may include an optical system including a first lens 510, a second

TABLE 8

|  | S1 | S2 | S3 | S4 | S5 | S6 | S7 |
|---|---|---|---|---|---|---|---|
| Conic Constant(K) | −0.86 | 15.41 | 16.23 | 3.99 | −95.00 | 99.00 | 99.00 |
| Fourth Coefficient(A) | 0.00 | −0.07 | −0.09 | −0.04 | 0.00 | 0.01 | 0.04 |
| Sixth Coefficient(B) | 0.09 | 0.46 | 0.56 | 0.24 | −0.10 | −0.26 | −0.54 |
| Eighth Coefficient(C) | −0.31 | −2.77 | −3.80 | −1.59 | 0.39 | 1.29 | 2.33 |
| Tenth Coefficient(D) | 0.55 | 10.87 | 18.01 | 7.30 | −0.94 | −4.36 | −6.72 |
| Twelfth Coefficient(E) | −0.24 | −28.35 | −57.75 | −21.68 | 1.19 | 10.15 | 13.23 |
| Fourteenth Coefficient(F) | −1.09 | 51.00 | 128.96 | 43.19 | −0.11 | −16.70 | −18.37 |
| Sixteenth Coefficient(G) | 2.81 | −65.00 | −204.95 | −59.13 | −2.31 | 19.76 | 18.32 |
| Eighteenth Coefficient(H) | −3.52 | 59.54 | 234.46 | 56.03 | 4.36 | −16.97 | −13.24 |
| Twentieth Coefficient(J) | 2.77 | −39.31 | −193.35 | −36.29 | −4.41 | 10.55 | 6.92 |
| Twenty Second Coefficient(L) | −1.46 | 18.54 | 113.76 | 15.38 | 2.84 | −4.70 | −2.58 |
| Twenty Fourth Coefficient(M) | 0.51 | −6.09 | −46.53 | −3.79 | −1.20 | 1.45 | 0.66 |
| Twenty Sixth Coefficient(N) | −0.12 | 1.32 | 12.56 | 0.33 | 0.32 | −0.30 | −0.11 |
| Twenty Eighth Coefficient(O) | 0.02 | −0.17 | −2.01 | 0.06 | −0.05 | 0.04 | 0.01 |
| Thirtieth Coefficient(P) | 0.00 | 0.01 | 0.14 | −0.01 | 0.00 | 0.00 | 0.00 |

|  | S8 | S9 | S10 | S11 | S12 | S13 | S14 |
|---|---|---|---|---|---|---|---|
| Conic Constant(K) | 92.99 | 14.34 | −88.58 | −6.39 | −2.06 | −0.83 | −21.99 |
| Fourth Coefficient(A) | −0.01 | −0.06 | −0.09 | 0.01 | 0.04 | −0.11 | −0.05 |
| Sixth Coefficient(B) | −0.15 | 0.01 | 0.03 | −0.01 | 0.00 | 0.08 | 0.03 |
| Eighth Coefficient(C) | 0.49 | 0.03 | 0.01 | 0.00 | −0.01 | −0.04 | −0.01 |
| Tenth Coefficient(D) | −1.03 | −0.06 | −0.02 | 0.00 | 0.01 | 0.01 | 0.00 |
| Twelfth Coefficient(E) | 1.51 | 0.04 | 0.02 | 0.00 | 0.00 | 0.00 | 0.00 |
| Fourteenth Coefficient(F) | −1.57 | −0.02 | −0.01 | 0.00 | 0.00 | 0.00 | 0.00 |
| Sixteenth Coefficient(G) | 1.19 | 0.01 | 0.00 | 0.00 | 0.00 | 0.00 | 0.00 |
| Eighteenth Coefficient(H) | −0.66 | 0.00 | 0.00 | 0.00 | 0.00 | 0.00 | 0.00 |
| Twentieth Coefficient(J) | 0.27 | 0.00 | 0.00 | 0.00 | 0.00 | 0.00 | 0.00 |
| Twenty Second Coefficient(L) | −0.08 | 0.00 | 0.00 | 0.00 | 0.00 | 0.00 | 0.00 |
| Twenty Fourth Coefficient(M) | 0.02 | 0.00 | 0.00 | 0.00 | 0.00 | 0.00 | 0.00 |
| Twenty Sixth Coefficient(N) | 0.00 | 0.00 | 0.00 | 0.00 | 0.00 | 0.00 | 0.00 |
| Twenty Eighth Coefficient(O) | 0.00 | 0.00 | 0.00 | 0.00 | 0.00 | 0.00 | 0.00 |
| Thirtieth Coefficient(P) | 0.00 | 0.00 | 0.00 | 0.00 | 0.00 | 0.00 | 0.00 | lens 520, a third lens 530, a fourth lens 540, a fifth lens 550, a sixth lens 560, and a seventh lens 570, and may further include a stop, a filter 580, and an image sensor 590.

Lens characteristics (a radius of curvature, a thickness of a lens or a distance between lenses, a refractive index, an Abbe number, and a focal length) of each lens are indicated in Table 9 below.

TABLE 9

| Surface No. | Note | Radius of Curvature | Thickness or Distance | Refractive Index | Abbe Number | Focal Length |
|---|---|---|---|---|---|---|
| S1 | First Lens | 2.34050 | 0.74555 | 1.547 | 56.1 | 5.62 |
| S2 | | 8.72464 | 0.10851 | | | |
| S3 | Second Lens | 6.73780 | 0.21000 | 1.680 | 19.2 | −15.33 |
| S4 | | 4.04021 | 0.46098 | | | |
| S5 | Third Lens | 18.53728 | 0.38427 | 1.642 | 23.9 | 30.52 |
| S6 | | 343.70020 | 0.34399 | | | |
| S7 | Fourth Lens | −57.20565 | 0.27000 | 1.680 | 19.2 | −20.73 |
| S8 | | 18.72890 | 0.38351 | | | |
| S9 | Fifth Lens | 10.17700 | 0.41037 | 1.571 | 37.4 | −215.82 |
| S10 | | 9.26311 | 0.53719 | | | |
| S11 | Sixth Lens | 2.77358 | 0.67928 | 1.547 | 56.1 | 6.23 |
| S12 | | 13.64237 | 1.09911 | | | |
| S13 | Seventh Lens | −10.91942 | 0.41000 | 1.547 | 56.1 | −4.40 |
| S14 | | 3.12607 | 0.12724 | | | |
| S15 | Filter | Infinity | 0.11000 | 1.519 | 64.2 | |
| S16 | | Infinity | 0.72000 | | | |
| S17 | Imaging Plane | Infinity | | | | |

A focal length f of the optical imaging system of the fifth example is 6.01 mm, f12 is 8 mm, Fno is 2.06, FOV is 88°, and IMG HT is 6 mm.

The definitions of f12, Fno, FOV, and IMG HT are as in the first example.

In the fifth example, the first lens 510 may have positive refractive power, the first surface of the first lens 510 may be convex, and the second surface of the first lens 510 may be concave.

The second lens 520 may have negative refractive power, the first surface of the second lens 520 may be convex, and the second surface of the second lens 520 may be concave.

The third lens 530 may have positive refractive power, and the first surface of the third lens 530 may be convex, and the second surface of the third lens 530 may be concave.

The fourth lens 540 may have negative refractive power, and the first and second surfaces of the fourth lens 540 may be concave.

The fifth lens 550 may have negative refractive power, the first surface of the fifth lens 550 may be convex in a paraxial region, and the second surface of the fifth lens 550 may be concave in a paraxial region.

Also, at least one inflection point may be formed on at least one of the first and second surfaces of the fifth lens 550. For example, the first surface of the fifth lens 550 may be convex in a paraxial region and may be concave in portions other than a paraxial region. Further, the second surface of the fifth lens 550 may be concave in a paraxial region and may be convex in portions other than a paraxial region.

The sixth lens 560 may have positive refractive power, the first surface of the sixth lens 560 may be convex in a paraxial region, and the second surface of the sixth lens 560 may be concave in a paraxial region.

At least one inflection point may be formed on at least one of the first and second surfaces of the sixth lens 560. For example, the first surface of the sixth lens 560 may be convex in a paraxial region and may be concave in portions other than a paraxial region. Further, the second surface of the sixth lens 560 may be concave in a paraxial region and may be convex in portions other than a paraxial region.

The seventh lens 570 may have negative refractive power, and the first and second surfaces of the seventh lens 570 may be concave in a paraxial region.

At least one inflection point may be formed on at least one of the first and second surfaces of the seventh lens 570. For example, the first surface of the seventh lens 570 may be concave in a paraxial region and may be convex in portions other than a paraxial region. Further, the second surface of the seventh lens 570 may be concave in a paraxial region and may be convex in portions other than a paraxial region.

Each surface of the first lens 510 to the seventh lens 570 may have an aspherical coefficient as in Table 10. For example, both an object-side surface and an image-side surface of each of the first lens 510 to the seventh lens 570 may be aspherical.

TABLE 10

|  | S1 | S2 | S3 | S4 | S5 | S6 | S7 |
|---|---|---|---|---|---|---|---|
| Conic Constant(K) | -0.90 | 17.11 | 16.33 | 3.48 | -94.71 | 99.00 | 99.00 |
| Fourth Coefficient(A) | -0.02 | -0.02 | -0.04 | -0.04 | 0.01 | -0.02 | 0.02 |
| Sixth Coefficient(B) | 0.20 | 0.01 | -0.10 | 0.17 | -0.15 | 0.04 | -0.37 |
| Eighth Coefficient(C) | -0.86 | -0.36 | 1.12 | -1.05 | 0.72 | -0.16 | 1.69 |
| Tenth Coefficient(D) | 2.46 | 2.59 | -5.83 | 4.16 | -2.30 | 0.08 | -5.10 |
| Twelfth Coefficient(E) | -4.70 | -9.42 | 20.21 | -9.55 | 5.03 | 1.09 | 10.34 |
| Fourteenth Coefficient(F) | 6.16 | 21.62 | -48.43 | 11.74 | -7.65 | -4.09 | -14.55 |
| Sixteenth Coefficient(G) | -5.52 | -33.77 | 82.17 | -3.12 | 8.23 | 7.66 | 14.54 |
| Eighteenth Coefficient(H) | 3.31 | 37.11 | -100.08 | -13.80 | -6.31 | -9.07 | -10.42 |
| Twentieth Coefficient(J) | -1.23 | -29.02 | 87.76 | 25.13 | 3.43 | 7.23 | 5.34 |
| Twenty Second Coefficient(L) | 0.20 | 16.07 | -54.90 | -22.53 | -1.30 | -3.95 | -1.93 |
| Twenty Fourth Coefficient(M) | 0.04 | -6.15 | 23.90 | 12.26 | 0.33 | 1.46 | 0.47 |
| Twenty Sixth Coefficient(N) | -0.03 | 1.55 | -6.87 | -4.11 | -0.05 | -0.35 | -0.07 |
| Twenty Eighth Coefficient(O) | 0.01 | -0.23 | 1.17 | 0.78 | 0.00 | 0.05 | 0.01 |
| Thirtieth Coefficient(P) | 0.00 | 0.02 | -0.09 | -0.07 | 0.00 | 0.00 | 0.00 |

|  | S8 | S9 | S10 | S11 | S12 | S13 | S14 |
|---|---|---|---|---|---|---|---|
| Conic Constant(K) | 91.17 | 13.47 | -95.64 | -6.89 | -5.00 | -0.96 | -20.11 |
| Fourth Coefficient(A) | -0.03 | -0.08 | -0.10 | 0.01 | 0.04 | -0.06 | -0.02 |
| Sixth Coefficient(B) | -0.01 | 0.06 | 0.08 | -0.01 | -0.02 | 0.02 | 0.00 |
| Eighth Coefficient(C) | 0.02 | -0.03 | -0.06 | 0.00 | 0.00 | -0.01 | 0.00 |
| Tenth Coefficient(D) | -0.05 | -0.02 | 0.04 | 0.00 | 0.00 | 0.00 | 0.00 |
| Twelfth Coefficient(E) | 0.09 | 0.06 | -0.02 | 0.00 | 0.00 | 0.00 | 0.00 |
| Fourteenth Coefficient(F) | -0.09 | -0.05 | 0.01 | 0.00 | 0.00 | 0.00 | 0.00 |
| Sixteenth Coefficient(G) | 0.05 | 0.03 | 0.00 | 0.00 | 0.00 | 0.00 | 0.00 |
| Eighteenth Coefficient(H) | -0.01 | -0.01 | 0.00 | 0.00 | 0.00 | 0.00 | 0.00 |
| Twentieth Coefficient(J) | 0.00 | 0.00 | 0.00 | 0.00 | 0.00 | 0.00 | 0.00 |
| Twenty Second Coefficient(L) | 0.00 | 0.00 | 0.00 | 0.00 | 0.00 | 0.00 | 0.00 |
| Twenty Fourth Coefficient(M) | 0.00 | 0.00 | 0.00 | 0.00 | 0.00 | 0.00 | 0.00 |
| Twenty Sixth Coefficient(N) | 0.00 | 0.00 | 0.00 | 0.00 | 0.00 | 0.00 | 0.00 |
| Twenty Eighth Coefficient(O) | 0.00 | 0.00 | 0.00 | 0.00 | 0.00 | 0.00 | 0.00 |
| Thirtieth Coefficient(P) | 0.00 | 0.00 | 0.00 | 0.00 | 0.00 | 0.00 | 0.00 |

Figure 10:
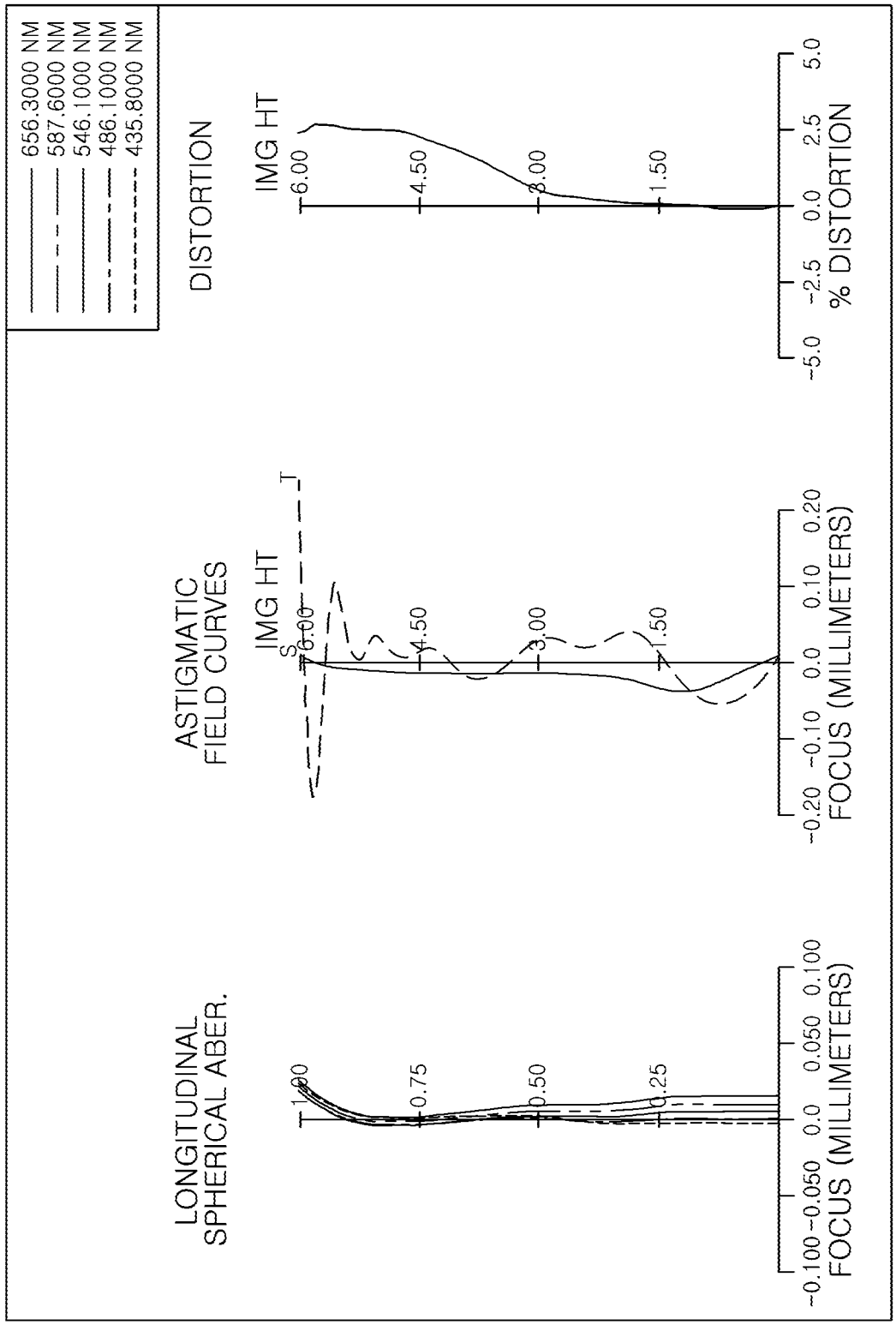
FIG. 10 is a diagram illustrating aberration properties of the optical imaging system illustrated in FIG. 9.

In addition, the optical imaging system as described in the fifth example above may have aberration characteristics as illustrated in FIG. 10.

Table 11 lists values of conditional expressions of the optical imaging system for the first through fifth examples.

TABLE 11

| Conditional Expressions | First Example | Second Example | Third Example | Fourth Example | Fifth Example |
|---|---|---|---|---|---|
| 0 < f1/f < 1.8 | 0.904 | 0.904 | 0.904 | 0.911 | 0.935 |
| 25 < v1 − v2 < 45 | 36.9 | 36.9 | 36.9 | 36.9 | 36.9 |
| v1 − v3 < 35 | 32.2 | 32.2 | 32.2 | 32.2 | 32.2 |
| 15 < v1 − v5 < 25 | 18.7 | 18.7 | 18.7 | 18.7 | 18.7 |
| (v2 + v3 + v4 + v5)/v1 < 2 | 1.777 | 1.777 | 1.777 | 1.777 | 1.777 |
| −4 < f2/f < −1 | −2.342 | −2.339 | −2.344 | −2.465 | −2.551 |
| f3/f > 3 | 5.162 | 5.151 | 5.293 | 5.893 | 5.078 |
| |f4/f| > 3 | 3.533 | 3.546 | 3.643 | 3.716 | 3.449 |
| |f5/f| > 5 | 7.164 | 7.292 | 9.256 | 14.929 | 35.910 |
| 0 < f6/f < 2 | 1.297 | 1.305 | 1.246 | 1.146 | 1.037 |
| −2 < f7/f < 0 | −0.702 | −0.710 | −0.697 | −0.681 | −0.732 |
| TTL/f < 1.2 | 1.129 | 1.132 | 1.132 | 1.141 | 1.165 |
| |f1/f2| < 1 | 0.386 | 0.386 | 0.386 | 0.370 | 0.367 |
| −2 < f2/f3 < 0 | −0.454 | −0.454 | −0.443 | −0.418 | −0.502 |
| BFL/f < 0.3 | 0.152 | 0.152 | 0.151 | 0.154 | 0.159 |
| D1/f < 0.1 | 0.019 | 0.019 | 0.018 | 0.016 | 0.018 |
| 84° < FOV < 92° | 86.8 | 86.9 | 86.8 | 87.3 | 88.0 |
| Fno < 2.2 | 2.10 | 2.09 | 2.07 | 2.08 | 2.06 |
| TTL/(2*IMG HT) ≤ 0.6 | 0.581 | 0.579 | 0.579 | 0.579 | 0.583 |
| 1 < f12/f < 2 | 1.313 | 1.313 | 1.311 | 1.299 | 1.331 |

According to the aforementioned example embodiments, the optical imaging system may implement high resolution and may have a reduced size.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
 a first lens, a second lens, a third lens, a fourth lens, a fifth lens, a sixth lens, and a seventh lens disposed in order from an object side,
 wherein −4<f2/f<−1 is satisfied, where f2 is a focal length of the second lens, and f is a focal length of the optical imaging system,
 wherein TTL/(2*IMG HT)≤0.6 is satisfied, where TTL is a distance on an optical axis from an object-side surface of the first lens to an imaging plane of an image sensor, and IMG HT is half a diagonal length of the imaging plane of the image sensor,
 wherein the optical imaging system has a total of seven lenses, and
 wherein the first lens has positive refractive power, the second lens has negative refractive power, the third lens has positive refractive power, the fourth lens has negative refractive power, the sixth lens has positive refractive power, and the seventh lens has negative refractive power.

2. The optical imaging system of claim 1, wherein (v2+v3+v4+v5)/v1<2 is satisfied, where v1 is an Abbe number of the first lens, v2 is an Abbe number of the second lens, v3 is an Abbe number of the third lens, v4 is an Abbe number of the fourth lens, and v5 is an Abbe number of the fifth lens.

3. The optical imaging system of claim 1, wherein 0<f1/f<1.8 is satisfied, where f1 is a focal length of the first lens, and f is a focal length of the optical imaging system.

4. The optical imaging system of claim 1, wherein f3/f>3 is satisfied, where f3 is a focal length of the third lens, and f is a focal length of the optical imaging system.

5. The optical imaging system of claim 1, wherein |f4/f|>3 is satisfied, where f4 is a focal length of the fourth lens, and f is a focal length of the optical imaging system.

6. The optical imaging system of claim 1, wherein |f5/f|>5 is satisfied, where f5 is a focal length of the fifth lens, and f is a focal length of the optical imaging system.

7. The optical imaging system of claim 1, wherein 0<f6/f<2 is satisfied, where f6 is a focal length of the sixth lens, and f is a focal length of the optical imaging system.

8. The optical imaging system of claim 1, wherein −2<f7/f<0 is satisfied, where f7 is a focal length of the seventh lens, and f is a focal length of the optical imaging system.

9. The optical imaging system of claim 1, wherein TTL/f<1.2 is satisfied, where f is a focal length of the optical imaging system, and
 wherein BFL/f<0.3 is satisfied, where BFL is a distance on the optical axis from an image-side surface of the seventh lens to the imaging plane of the image sensor.

10. The optical imaging system of claim 1, wherein |f1/f2|<1 is satisfied, where f1 is a focal length of the first lens, and f2 is a focal length of the second lens.

11. The optical imaging system of claim 1, wherein −2<f2/f3<0 is satisfied, where f2 is a focal length of the second lens, and f3 is a focal length of the third lens.

12. The optical imaging system of claim 1, wherein D1/f<0.1 is satisfied, where D1 is a distance on the optical axis from an image-side surface of the first lens to an object-side surface of the second lens, and f is a focal length of the optical imaging system.

13. The optical imaging system of claim 1, wherein 84°<FOV<92° is satisfied, where FOV is a field of view of the optical imaging system.

14. The optical imaging system of claim 1, wherein Fno<2.2 is satisfied, where Fno is an F number of the optical imaging system.

15. The optical imaging system of claim 1, wherein 1<f12/f<2 is satisfied, where f12 is a combined focal length of the first lens and the second lens, and f is a focal length of the optical imaging system.

16. The optical imaging system of claim 1, wherein 25<v1−v2<45 is satisfied where v1 is an Abbe number of the first lens and v2 is an Abbe number of the second lens.

17. The optical imaging system of claim 1, wherein v1−v3<35 is satisfied where v1 is an Abbe number of the first lens and v3 is an Abbe number of the third lens.

18. The optical imaging system of claim 1, wherein 15<v1−v5<25 is satisfied where v1 is an Abbe number of the first lens and v5 is an Abbe number of the fifth lens.

\* \* \* \* \*